United States Patent [19]

Kato et al.

[11] 4,123,171
[45] Oct. 31, 1978

[54] DENSITY MEASURING DEVICE

[75] Inventors: Masahiko Kato; Hisao Katogi, both of Kodaira; Ikuo Seki, Tokyo, all of Japan

[73] Assignee: Toppan Printing Co., Ltd., Tokyo, Japan

[21] Appl. No.: 723,895

[22] Filed: Sep. 16, 1976

[30] Foreign Application Priority Data

Sep. 22, 1975 [JP] Japan .............................. 50-113695

[51] Int. Cl.² ............................................. G01J 3/50
[52] U.S. Cl. .................................. 356/175; 356/178; 356/186; 356/203
[58] Field of Search ............... 356/175, 178, 186, 202, 356/203; 358/107

[56] References Cited

U.S. PATENT DOCUMENTS

| | | | |
|---|---|---|---|
| 3,809,482 | 5/1974 | Aslund et al. .................... | 356/203 X |
| 3,876,824 | 4/1975 | Hipwell ........................... | 356/175 X |

OTHER PUBLICATIONS

Gal'perin et al., *Soviet Physics — Crystallography,* vol. 16, No. 1, Jul.-Aug., 1971, pp. 209-211.
Farber et al., *Electronics,* Dec. 1, 1961, pp. 38-41.
Arndt et al., Journal of Scientific Instruments (Journal of Physics E), series 2, vol. 1, 1968, pp. 510-516.

*Primary Examiner*—F. L. Evans
*Attorney, Agent, or Firm*—Lerner, David, Littenberg & Samuel

[57] ABSTRACT

A density measuring device for easily and quickly measuring the optical densities of original pictures which is characterized in that an original picture is scanned by a scanning device to obtain electrical signals of the original picture, the signals are then converted into secondary electrical signals corresponding to the optical density of the original picture by means of a logarithmic converting circuit, calibration signals generated by a calibration signal generator are added to the secondary electrical signals, and thus obtained combined signals are displayed on a wave-form monitor.

12 Claims, 10 Drawing Figures

DENSITY MEASURING DEVICE

BACKGROUND OF THE INVENTION (1) Field of the Invention

This invention relates to a density measuring device for color plate-making. More particularly, the invention relates to a density measuring device for measuring the optical densities of color pictures or patterns to be printed, in which the original picture is scanned by a television camera and the resultant electrical signals are electronically processed and displayed on an oscilloscope so as to measure the maximum and minimum color densities of the original picture.

(2) Description of Prior Art

When graduated color image such as a color picture is printed, it is necessary to measure the optical densities of color components such as yellow (Y), magneta (M), cyan (C) and black (Bl) of the original picture, and especially, the optical densities in highlight and shadow portions must be accurately measured in order to determine the working conditions for the color separation in plate-making.

Even though the measurement of the optical density in a white highlight portion with the conventional densitometer is relatively easy, when the original picture has no white highlight portion, the setting of highlight level in plate-making is somewhat difficult. Further, when the maximum and minimum densities are measured according to the conventional method, it is necessary that several highlight and shadow portions in an original picture are checked up with the naked eye, all the densities of such portions are measured and the resultant values of densities are compared together so as to determine the maximum and minimum values. This procedure takes much labour and troubles.

BRIEF SUMMARY OF THE INVENTION

In view of the above-described disadvantages caused to occur in the prior art method for density measurement, the primary object of the present invention is to provide an improved density measuring device, with which the maximum and minimum densities can be easily and quickly measured, and in addition, the density of a desired portion can also be measured or compared with the densities of other portions.

Another object of the present invention is to provide a density measuring device which indicates directly the data of optical densities.

A further object of the present invention is to provide a density measuring device which can be applied to color proofing apparatus.

According to the present invention, the density measuring device is characterized in that an original picture to be measured is scanned by a scanning device such as a television camera to obtain electrical signals of the original picture, the signals are then converted into secondary electrical signals corresponding to the optical density of the original picture by means of a logarithmic converting circuit, the calibration signals generated by a calibration signal generator are added to the secondary electric signals, and thus obtained combined signals are displayed on a wave-form monitor such as an oscilloscope. In the present invention, the combination of a flying spot scanner and a photo-electro transducer, or optical scanning device with multi-color separating means is also used as the above scanning device. Further, the electrical signals obtained by scanning with a color proof apparatus can be electronically processed by the density measuring device of the present invention. Still further, the optical density of a desired portion in the original picture can be measured by the density measuring device of the present invention.

BRIEF DESCRIPTION OF THE DRAWINGS

The nature, principle and details of the invention will be more clearly apparent from the following detailed description with respect to preferred embodiments of the invention with reference to the accompanying drawings, in which.

DETAILED DESCRIPTION OF PREFERRED EMBODIMENTS

Figure 1:
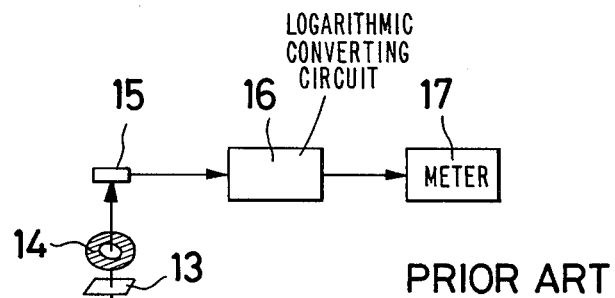
FIG. 1 is a block diagram of a densitometer in the prior art.

Referring now to the accompanying drawings, the detailed explanation on the present invention will be given in the following.

For the better understanding of the present invention, a densitometer in the conventional art will be firstly described with reference to FIG. 1. In the block diagram shown in FIG. 1, the numeral 11 is a light source; 12, an original color picture to be measured; 13, a color filter; 14, an aperture; 15, a photo-electro transducer; 16, a logarithmic converting circuit; and 17, a meter.

In the measurement of an optical density of the original picture 12, it is firstly lighted by turning the light source 11 on and the light beam transmitted through the original picture 12 are then filtered by the color separation filter 13 so as to obtain one primary color light through the filter 13. Thus obtained primary color light that is to be measured is introduced into the photo-electro transducer 15 by way of the aperture 14 and the light is converted into electrical signals by the transducer 15. Incidentally, the relation between a rate of transmission (transmissibility) T and an optical density D is represented by the following equation:

$$D = \log_{10}(1/T)$$

So that the photoelectrically obtained signal is then subjected to logarithmic conversion through the logarithmic converting circuit 16 and it is then indicated on the meter 17.

In the case that an original color picture 12 has white highlight portions, the setting of the highlight level can be carried out relatively easily since the optical density of one of such portions can be taken as the standard for obtaining separation films in plate-making. While, in the case that an orginal color picture has no white highlight portion, the highlight level is set by measuring the optical density of the color complementary to the lightest color in the original picture, however, several difficulties and troubles are caused to occur.

Further, when the highest optical density is measured with regard to an original picture comprising various optical density portions, some points of high density portions on the picture must be checked up by the naked eye and they are moved below the aperture 14 so as to obtain the value of the highest density, which is also applied to the measurement of the lowest density. Therefore, it has been difficult in the prior art to measure the optical densities in original color pictures and much labour and troubles have been required for such measurement.

Figure 2:
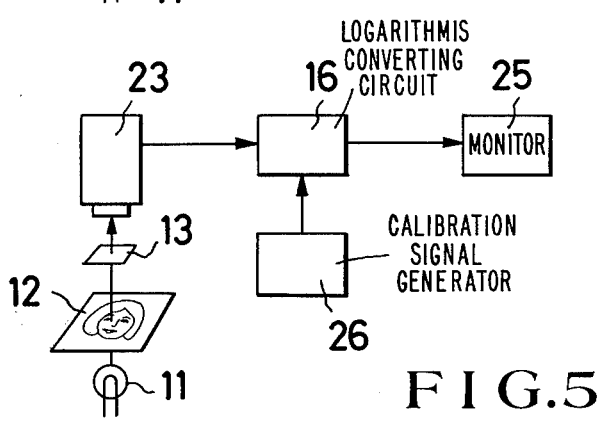
FIG. 2 is a block diagram of the first embodiment of density measuring device of the present invention.

FIG. 2 is a block diagram of the first embodiment of density measuring device of the present invention, in which the numeral 23 indicates a television camera (hereinafter referred to as "TV camera"; 25, a wave-form monitor such as an oscilloscope; and 26, a calibration signal generator. Other numerals indicate the same means as those in the above-mentioned FIG. 1, respectively.

In the measurement of the optical density of the original picture 12, the light source 11 is turned on to light up the original picture 12 and the image of transmitted light is thrown through the filter 13 and then to the TV camera 23 in which the image is scanned with electron beams so as to convert it into electrical signals. These photoelectrically converted signals are further converted into other electrical signals that correspond to the density by using the logarithmic converting circuit 16. Meanwhile, calibration signals are produced by the calibration signal generator 26 and the signals are added in the retrace blanking interval of the former electrical signals in such manner that the maximum level of the electrical signals coincide with the zero value of the calibration signals. Thus, combined signals are then displayed on the wave-form monitor 25.

In the density measuring device shown by the block diagram in FIG. 2, the transmitted light through the original transparent picture 12 is measured, however, when the reflected light from an original reflection picture is measured, the picture 12 may be lighted by a light source 11 placed on the opposite side compared with the side shown in FIG. 2, and the reflected light is caught by the TV camera 23. After that, the same measures as the above case can be taken so as to produce the wave-form image on the wave-form monitor 25.

Figure 3A:
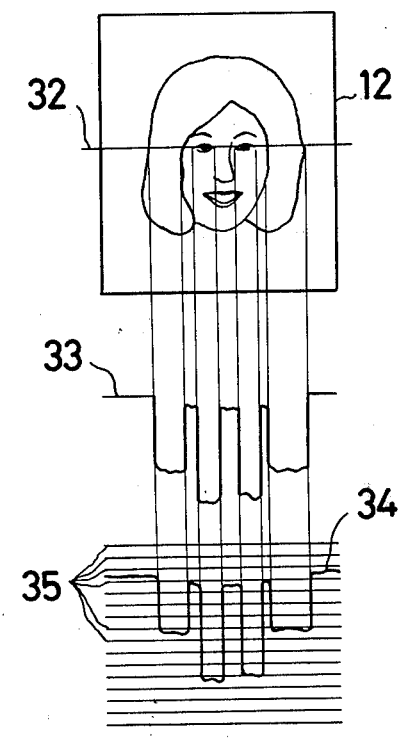
FIGS. 3A and 3B are explanatory drawings for the waveforms in the density measuring device of FIG. 2.
Figure 3B:
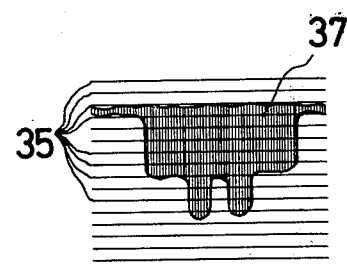

FIGS. 3A and 3B are explanatory illustrations for the wave-form obtained by the device shown in FIG. 2, in which the numeral 32 indicates a selected scanning line; 33, the obtained electrical signal; 34 and 37, the electrical signals after the logarithmic conversion; and 35, optical density calibration signals.

In FIG. 3A, the electrical signal 33 is obtained by scanning an original picture 12 with a selected single scanning line 32. According to the intensity of transmitted light through the original picture 12, the value of electrical signal 33 is varied, that is, the electrical signal 33 corresponding to high-light portions is high, on the other hand, the electrical signal in shadow portion is low. The relation between a rate of transmission T and an optical density D is represented by the following equation:

$$D = \log_{10}(1/T)$$

Therefore, the electrical signal 33 is then subjected to logarithmic conversion in accordance with the above equation to obtain the electrical signal 34 after the logarithmic conversion. In this example, the calibration signals 35 to be indicated on the wave-form monitor 25 are arranged at regular intervals and in correspondence with the densities. The calibration signals 35 such as stepped waves are combined during the vertical or horizontal retrace blanking interval of the above electrical signals 34 and they are simultaneously displayed on the wave-form monitor 25. With these calibration signals 35, the optical densities in several portions at the scanning line 32 on the original picture 12 can be directly read out. In FIG. 3A, the displayed pattern shows the state of a selected single scanning line 32. When the original picture 12 is totally scanned by the TV camera 23 with a plurality of scanning lines and obtained electrical signals are logarithmically converted, the resultant signals 37 after the conversion can be represented by an area having widths (optical density ranges) as shown in FIG. 3B. Therefore, by using the density measuring device of the present invention, the maximum and minimum optical densities of the original picture as well as the optical density of every portion of the original picture 12 can be quite easily measured.

Figure 4:
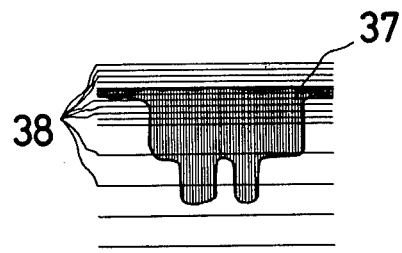
FIG. 4 is an explanatory drawing for density calibration signals in another embodiment.

As disclosed above, the density calibration signals 35 are arranged at regular intervals from the maximum density of 3.0 to the minimum density of 0 in the above embodiment as shown in FIGS. 3A and 3B. However, it is important to measure the optical density of each primary color in the highlight portion as accurate as possible in the practical plate-making. Accordingly, in the embodiment as shown in FIG. 4, the density calibration signals 38 in the low density range are further subdivided. In this embodiment, the density calibration signals 38 are indicated at intervals of 0.1 in the range from 0 to 1.0 and 0.5 in the range from 1.0 to 3.0. In the above-disclosed two embodiments, the density calibration signals 35 and 38 are displayed in horizontal lines, however, they can be arranged in step-like forms, if desired.

Figure 5:
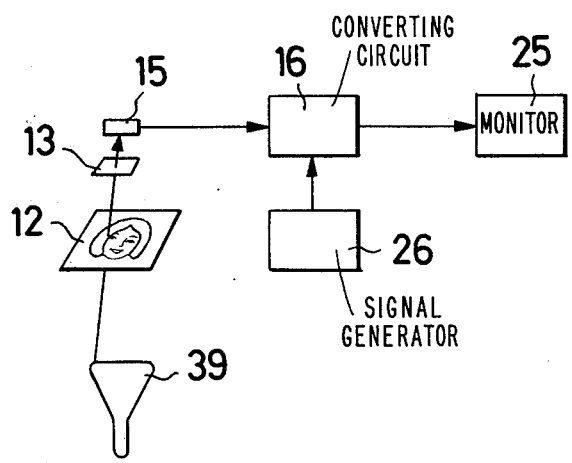
FIG. 5 is a block diagram of the second embodiment of density measuring device of the present invention in which a flying spot scanner is used as a scanning device.

The second embodiment of the density measuring device of the present invention is shown in FIG. 5, in which the numeral 39 denotes a flying spot scanner and other numerals are respectively the same as those of the foregoing embodiments shown in FIGS. 1 and 2.

In the flying spot scanner, a moving spot of light that is controlled mechanically or electrically scans the image field and the light reflected from or transmitted through the image field is picked up by a photo-electro transducer to generate electric signals. In this embodiment, the original picture 12 is scanned by the optical beam from the flying spot scanner 39, and the transmitted light is pressed through the filter 13 and caught by the photo-electro transducer 15 to be transduced into electrical signals. The procedure after this is the same as that of the above embodiment shown in FIG. 2.

Figure 6:
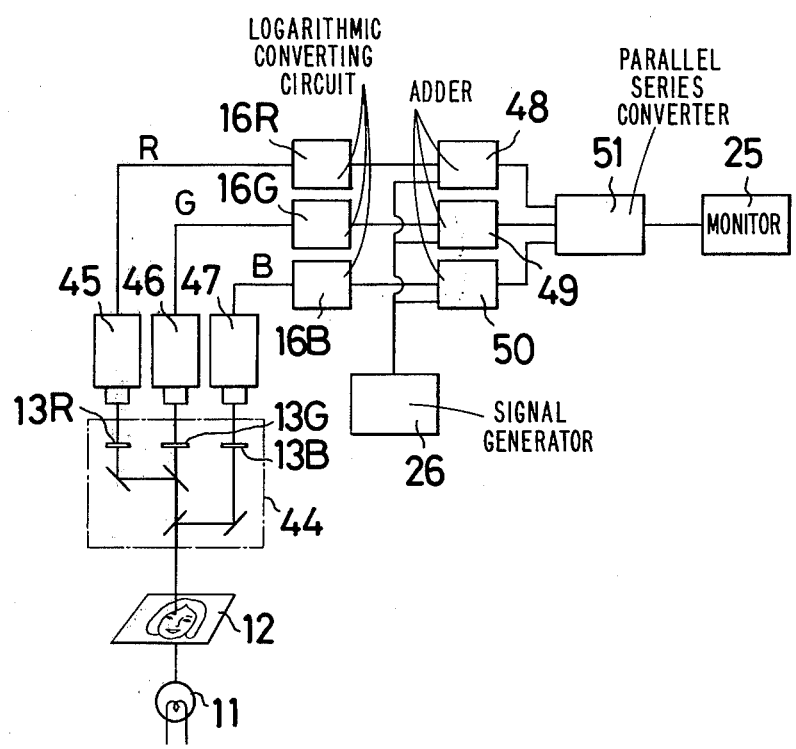
FIG. 6 is a block diagram of the third embodiment of density measuring device of the present invention in which three color separation is carried out in the scanning step.

In FIG. 6 is shown the third embodiment of the density measuring device of the present invention, in which the numeral 44 indicates a three-color optical separation system; 45 to 47, TV cameras exclusive for R (red), G (green) and B (blue), respectively; 48, 49 and 50, adders; and 51, a parallel-series converter. Other numerals are the same as those in FIGS. 1 and 2.

In the operation, the original picture 12 is lighted by turning on the light source 11 and the transmitted light through the original picture 12 is then separated into R (red), G (green) and B (blue) by the three-color optical separation system 44. Thus obtained three-color separated images are formed in the TV cameras 45 - 47 of R, G and B, and at the same time, the images are converted into electrical signals by scanning with electron beams. In order to convert the rates of transmission into optical densities, the electrical signals are led to the respective logarithmic converting circuits 16R, 16G and 16B. The calibration signals generated by the calibration signal generator 26 are then added to the electrical signals after the logarithmic conversion, by using the respective adders 48, 49 and 50, and thus obtained electrical signals are led to the parallel-series converter 51. In the parallel-series converter 51, the three parallel electrical signals which are gated at every field are converted into series triple signals such as R, G, B, R, G, B, . . . and they are displayed on the wave-form monitor 25. Thus the densities of separated colors of the original picture 12 can be siumltaneously measured. Though the three-color separation is exemplified in this embodiment, it will be easily understood by those skilled in the art that the present invention is not restricted to the three-color separation but similarly applicable to four-color separation.

Further, in place of the three-color separation system 44 and three TV cameras 45 to 47 shown in FIG. 6, a set of R, G and B field sequential filters, one TV camera 23 and a video recording apparatus can be used, in which the image of an original color picture is converted into R, G and B electrical video signals and they are recorded in the video recording apparatus, then the recorded electrical signals are simultaneously taken out.

Figure 7:
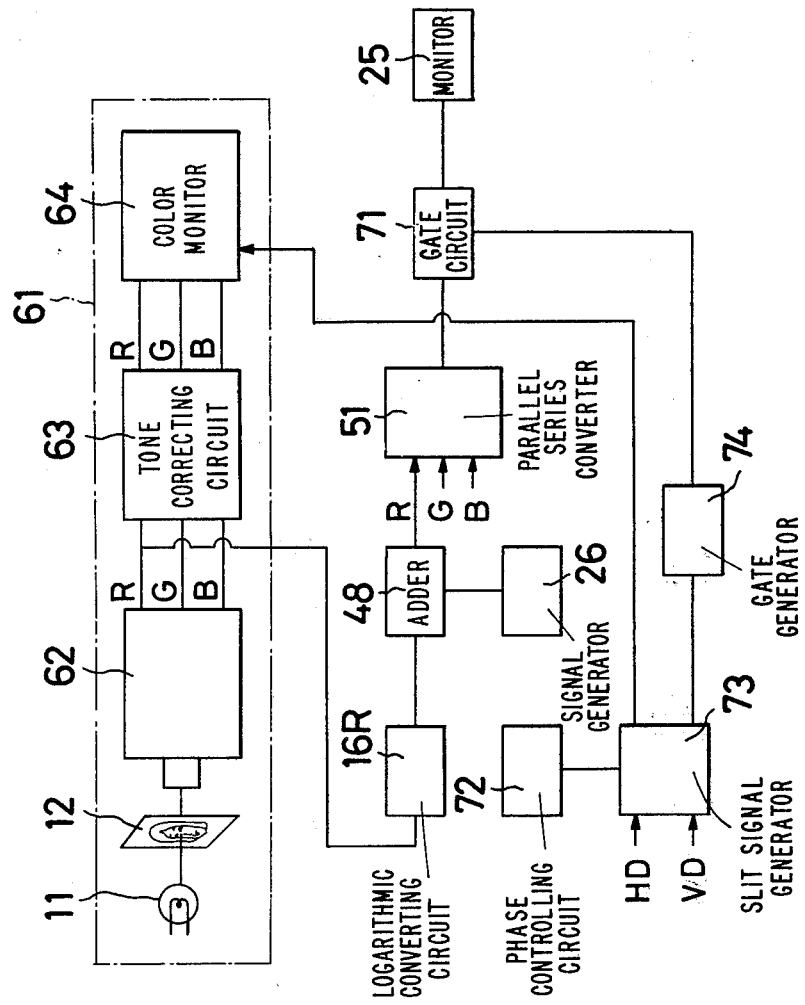
FIG. 7 is a block diagram of a density measuring device of the present invention which is applied to a color proofing apparatus.

Furthermore, the density measuring device shown in FIG. 6 can be applied to a color proof apparatus such as the apparatus disclosed in Japanese Laid-open Publication No. 40819 of 1974, "Method for displaying color images" (Dainippon Screen Mfg. Co., Ltd.). As schematically shown in FIG. 7, the image of original picture 12 is taken by a color TV camera 62 of the color proof apparatus 61 to obtain three-color video signals of R, G and B, and the obtained signals are displayed on a color monitor 64 having a color picture tube after passing the video signals through a tone correcting circuit 63. By observing the image on the color monitor 64, the tone correcting circuit 63 is manipulated until the image on the color monitor 64 becomes satisfactory. Thus, the conditions for color separation in plate-making can be obtained from the values of correction in the tone correcting circuit 63.

When the input signals for the logarithmic converting circuit 16 of FIG. 6 is taken from the TV camera 62 of the color proof apparatus 61, the optical densities of the original color picture 12 can be measured and the conditions for color separation process can be obtained more accurately and easily.

Another exemplar application of the density measuring device of the present invention will be disclosed in the following with reference to FIG. 7. In this embodiment, the portion to be measured on the original color picture 12 is indicated on the color monitor 64 of the color proof apparatus 61, and the optical density of such portion is indicated on the wave-form monitor 25.

Figure 8A:
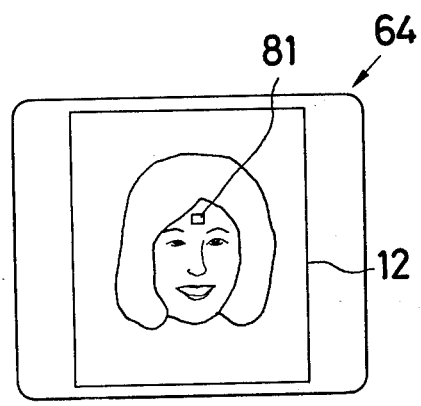
FIGS. 8A and 8B are schematic illustrations of image of a color monitor and a wave-form monitor as shown in FIG. 7.
Figure 8B:
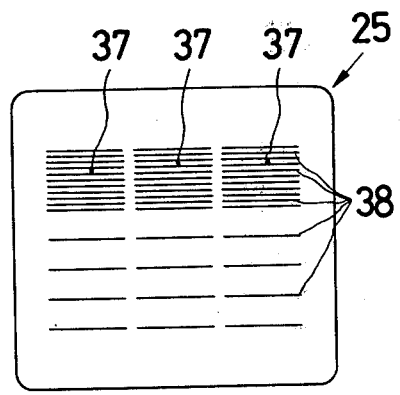

The electrical signal obtained by the TV camera 62, for example, R (red) signal is displayed on the wave-form monitor 25 through the above-described logarithmic converting circuit 16R, adder 48, parallel-series converter 51 and gate circuit 71. While a slit signal generator 73 is supplied with horizontal drive signals (HD), vertical drive signals (VD) and spot position shifting signals obtained from a phase controlling circuit 72, thus the positioning signals of a square spot (respective two vertical and horizontal lines) are produced by the slit signal generator 73 triggered with the HD and VD signals. These positioning signals are supplied to the color monitor 64 and are mixed to video signals, thus as shown in FIG. 8A, a square spot 81 and the image of the original picture 12 are simultaneously displayed on the color monitor 64.

Further, the positioning signals generated by the slit signal generator 73 are supplied to the above-mentioned gate circuit 71 by way of gate generator 74 so as to cut the electric signals other than the square spot except retrace blanking interval by the gate circuit 71, and thereby displaying the electric signals 37 within the spuare spot and calibration signals 38 on the wave-form monitor 25. Of course, the position of the square spot 81 can be freely moved by the phase controlling circuit 72 and, with observing the image on the color monitor 64, the position of the square spot 81 is shifted so as to measure the optical density of desired portions on the original color picture 12. Since the functions of the logarithmic converting circuit 16, adder 48, parallel-series converter 51 and calibration signal generator 26 are the same as those of the foregoing embodiments, the detailed explanation for them are omitted here.

As described in the above, in the present invention, the optical densities of the whole portions of an original color picture as well as of monochromatic picture can be indicated, and the range of optical densities, the maximum density, the minimum density and the density of a certain portion can be easily measured, in addition, the comparison of densities in several points can also be achieved. Therefore, the density measuring device of the present invention is quite useful for the density measurement in color plate-making.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A measuring device for measuring the optical density of an object comprising:
   scanning means for scanning said object to produce an optical density signal relating to the optical density of the scanned object;
   display means responsive to said optical density signal for displaying said optical density signal in graphic form on said display means; and
   marker signal generating means responsive to said scanning means and independent of said optical density signal for generating a signal to produce a plurality of calibration markers on said display means in a predetermined relationship to said optical density signal so that the measurement of the displayed optical density signal can be read directly from said display means with the aid of said calibration markers.

2. The measuring device of claim 1 wherein said scanning means comprises a television camera.

3. The measuring device of claim 1 wherein said scanning means comprises a flying spot scanner and a photoelectro transducer.

4. The measuring device of claim 1 wherein said object to be scanned displays a plurality of colors and wherein said scanning means includes multi color separation means for separating said optical density signal into a plurality of color signals, each of said color signals corresponding to the optical density of one of said colors displayed by the scanned object; and wherein said display means is responsive to each of said color signals for displaying separately on said display means said color signals in graphic form.

5. The measuring device of claim 1 wherein said marker signal generating means comprises means for generating a signal to produce first and second pluralities of calibration markers on said display means, said first plurality of calibration markers having a scale which is more finely divided than the scale of said second plurality of calibration markers.

6. The measuring device of claim 1 wherein said optical density signal produced by said scanning means includes at least one retrace blanking interval; wherein said marker signal generating means generates said signal for producing calibration markers during said retrace blanking interval, and also includes means for adding said signal for producing calibration markers to said optical density signal to produce a combined signal; and wherein said display means is responsive to said combined signal to display said combined signal in graphic form on said display means.

7. A measuring device for measuring the optical density of a subsection of an object comprising:

scanning means for scanning said object to produce an optical density signal related to the optical density of the scanned object;

identification signal deriving means responsive to said scanning means for deriving an identification signal to identify the subsection to be measured of the object;

display means responsive to said optical density signal for displaying at least a portion of said optical density signal in graphic form on said display means;

marker signal generating means responsive to said scanning means and independent of said optical density signal for generating a signal to produce a plurality of calibration markers on said display means in a predetermined relationship to said optical density signal; and gate means responsive to said optical density signal and rendered effective by said identification signal for enabling said display means to display only that portion of said optical density signal corresponding to the optical density of the subsection of said object identified by said identification signal so that the measurement of the optical density of the identified subsection can be read directly from said display means with the aid of said calibration markers.

8. The measuring device of claim 7 wherein said optical density signal produced by said scanning means includes at least one retrace blanking interval; wherein said marker signal generating means generates said signal for producing calibration markers during said retrace blanking interval, and also includes means for adding said signal for producing calibration markers to said optical density signal to produce a combined signal; and wherein said gate means is responsive to said combined signal so that said calibration markers and said portion of said optical density signal enabled to be displayed by said gate means are displayed on said display means.

9. The measuring device of claim 7 further including object display means responsive to said optical density signal produced by said scanning means for displaying an image of said object scanned by said scanning means, and wherein said object display means is also responsive to said identification signal for identifying the subsection to be measured of said object on said object display means.

10. The measuring device of claim 9 wherein said scanning means comprises a television camera.

11. The measuring device of claim 10 wherein said identification deriving means comprises a slit signal generator for generating first and second positioning signals, said first positioning signal identifying the horizontal position of said subsection to be measured and said second positioning signal identifying the vertical position of said subsection to be measured.

12. The measuring device of claim 11 wherein said object display means is responsive to said first and second positioning signals for displaying a marker on the image displayed on said object display means corresponding to the subsection to be measured.

* * * * *